US009451219B2

(12) United States Patent
Paalasmaa et al.

(10) Patent No.: US 9,451,219 B2
(45) Date of Patent: Sep. 20, 2016

(54) PROVISION OF TARGET SPECIFIC INFORMATION

(75) Inventors: Joonas Paalasmaa, Helsinki (FI); Markus Kahari, Helsinki (FI); Antti Sorvari, Itäsalmi (FI)

(73) Assignee: Nokia Technologies Oy, Espoo (FI)

( * ) Notice: Subject to any disclaimer, the term of this patent is extended or adjusted under 35 U.S.C. 154(b) by 2564 days.

(21) Appl. No.: 11/791,629

(22) PCT Filed: Dec. 31, 2004

(86) PCT No.: PCT/FI2004/050199
§ 371 (c)(1),
(2), (4) Date: May 24, 2007

(87) PCT Pub. No.: WO2006/070047
PCT Pub. Date: Jul. 6, 2006

(65) Prior Publication Data
US 2007/0268392 A1    Nov. 22, 2007

(51) Int. Cl.
*H04N 7/18*      (2006.01)
*G01C 21/20*   (2006.01)
(Continued)

(52) U.S. Cl.
CPC .............. *H04N 7/185* (2013.01); *G01C 21/20* (2013.01); *G06F 17/3087* (2013.01);
(Continued)

(58) Field of Classification Search
CPC ...... H04N 7/185; H04N 7/181; H04L 67/18; G06F 17/30241; G06F 17/3087; G06F 17/30244; G01C 21/20; G06K 9/00671; G06K 9/228; H04W 4/02; H04W 64/00; G01S 19/51

USPC ........................................ 348/333.01–333.09
See application file for complete search history.

(56) References Cited

U.S. PATENT DOCUMENTS 5,884,224 A      3/1999  McNabb et al. ................... 702/2
5,926,116 A *   7/1999  Kitano et al. ................. 340/988
(Continued)

FOREIGN PATENT DOCUMENTS

DE      101 56 832 A1     6/2003
DE      102 45 900 A1     4/2004
(Continued)

OTHER PUBLICATIONS

European Search Report for EP Application No. 10182763.2-2201/2264621 dated Oct. 21, 2011, pp. 1-6.
(Continued)

*Primary Examiner* — Roberto Velez
*Assistant Examiner* — Tuan Le
(74) *Attorney, Agent, or Firm* — Ditthavong & Steiner, P.C.

(57) ABSTRACT

The invention concerns an electronic device for providing information (PUB_INFO, PERSON1_INFO) concerning one or more targets (PUB, PERSON1), relative to which target the device is to be aligned in a set manner, and in connection with which device are arranged at least one source (GPS, BM, COMP, TS, MEM) of first information (X, Y, ALT, $O_{device}$, IMSI_10.1), including at least a source of position and orientation information, in order to define the position of the device and the target, or for positioning the target and an aimer (CAM, DISP) for aligning the target relative to the device in a set manner, and in connection with which device, second information relating to the target can be arranged, which second information is arranged, in connection with the application of the aimer, to be brought to the attention of the user by the device. The aimer consists of a camera and a viewfinder (CAM, DISP).

16 Claims, 12 Drawing Sheets

Figure 1:
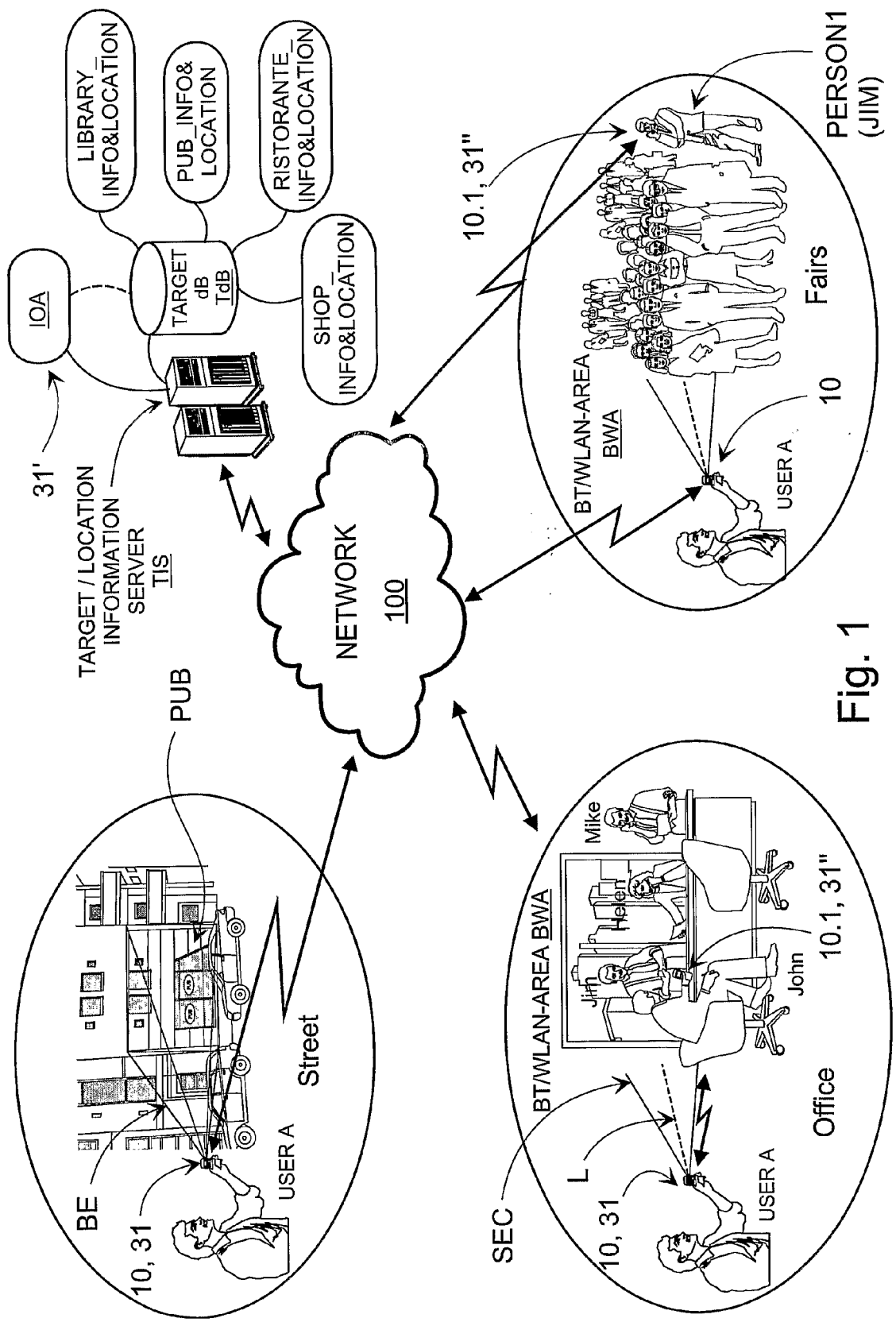

(51) Int. Cl.
*G06F 17/30* (2006.01)
*G06K 9/00* (2006.01)
*G06K 9/22* (2006.01)
*H04W 4/02* (2009.01)
*H04L 29/08* (2006.01)
*G01S 19/51* (2010.01)
*H04W 64/00* (2009.01)

(52) U.S. Cl.
CPC .. *G06F 17/30241* (2013.01); *G06F 17/30244* (2013.01); *G06K 9/00671* (2013.01); *G06K 9/228* (2013.01); *H04L 67/18* (2013.01); *H04N 7/181* (2013.01); *H04W 4/02* (2013.01); *G01S 19/51* (2013.01); *H04W 64/00* (2013.01)

(56) References Cited

U.S. PATENT DOCUMENTS

| | | | |
|---|---|---|---|
| 6,173,239 B1 | 1/2001 | Ellenby | 702/150 |
| 6,262,769 B1* | 7/2001 | Anderson et al. | 348/333.1 |
| 6,282,362 B1 | 8/2001 | Murphy et al. | 386/46 |
| 6,285,317 B1 | 9/2001 | Ong | |
| 6,377,793 B1 | 4/2002 | Jenkins | 455/412 |
| 6,381,540 B1 | 4/2002 | Beason et al. | 701/213 |
| 6,396,475 B1 | 5/2002 | Ellenby et al. | 345/156 |
| 6,504,571 B1* | 1/2003 | Narayanaswami et al. | 348/231.99 |
| 7,088,389 B2* | 8/2006 | Shibasaki et al. | 348/239 |
| 2002/0045988 A1* | 4/2002 | Yokota | 701/213 |
| 2002/0052684 A1 | 5/2002 | Bide | 701/200 |
| 2002/0102966 A1* | 8/2002 | Lev et al. | 455/412 |
| 2003/0200078 A1* | 10/2003 | Luo et al. | 704/2 |
| 2004/0174434 A1* | 9/2004 | Walker et al. | 348/211.3 |
| 2004/0208372 A1* | 10/2004 | Boncyk et al. | 382/181 |
| 2005/0057669 A1* | 3/2005 | Wakefield | 348/239 |
| 2005/0162523 A1* | 7/2005 | Darrell et al. | 348/211.2 |
| 2005/0185060 A1* | 8/2005 | Neven, Sr. | 348/211.2 |
| 2009/0325554 A1* | 12/2009 | Reber | 455/414.1 |

FOREIGN PATENT DOCUMENTS

| | | |
|---|---|---|
| EP | 1 199 646 A2 | 4/2002 |
| WO | WO 02/059716 A2 | 8/2002 |
| WO | WO 03/041000 A1 | 5/2003 |

OTHER PUBLICATIONS

Office Action for related European Application No. 04 805 230.2 dated Apr. 20, 2012, pp. 1-7.

Communication pursuant to Article 94(3) EPC for corresponding European Patent Application No. 10 182 781.4-1952 dated Jul. 24, 2013, 5 pages.

Lawson, S. "AT&T Wireless Helps Callers Find Friends", retrieved from web page on Jul. 5, 2013, <http://www.pcworld.com/article/102269/article.html>.

Communication pursuant to Article 94(3) EPC for related European Patent Application No. 10 182 763.2-1952 dated Jun. 5, 2014, 6p.

Office Action for corresponding Indian Application No. 4486/DELNP/2007, dated Oct. 22, 2014, 1 page.

* cited by examiner

PROVISION OF TARGET SPECIFIC INFORMATION

The present invention concerns to a device for providing information concerning one or more targets, relative to which target the device is to be aligned in a set manner, and in connection with which device are arranged
- at least one first source of information, including at least a source of position and orientation information, in order to define the position of the device and the target, or for positioning the target and
- aiming means for aligning the target relative to the device in a set manner, and in connection with which device second information relating to the target can be arranged, which second information is arranged in connection with the application of the aiming means to be brought to the attention of the user by means of the device. In addition, the invention also relates to a corresponding methods, system, and program products for implementing the invention.

Nowadays, people move from place to place and travel a great deal. Owing to that, they would also like, either beforehand or also actually at the location itself when the case comes one's way, to find out about interesting places, such as, for example, restaurants, museums, various sights, etc. The material relating to the interesting object must, however, generally be collected from many different sources and possibly also stored the information on some suitable medium, such as, for example, paper or a PC. It is often felt to be extremely difficult to obtain information when actually in the near of the object. Ensuring that the information material remains available, or carrying the storage medium used also adds to the difficulties of collecting and utilizing information relating to different objects.

Another problem associated with an object in which one is interested, is a situation in which the object itself is quite well known, but its current location is uncertain. The situation becomes even more difficult if the object can move. An exemplary case of this relates to a large crowds of people, from which a certain person should be found. Besides interesting places and lost persons, it could also be nice to get more information on unknown co-persons who are in view.

From US patent publication 2004/0119986 A1 is known a device to be attached to the head of the user, by means of which the current direction of the user's vision can be determined. The user can be provided with information on a target in the direction of their vision. The arrangement that is attached to the head is appropriate, for example, in museums and other limited use applications. However, in terms of usability it is not suitable, for example, for uses that are location-independent and continuously random.

From European patent publication EP 1 199 646 A2, U.S. Pat. No. 6,795,768, and US patent publication 2002/0140745 are known solutions, in which information can be provided to electronic device on the basis of their position and attitude. In these, the device is aimed at the target in a set manner. The aiming allows the target, about which the user wants information, to be determined. Information about the target determined by the position and attitude data can be transmitted to the device, for example, from a server arranged in a transmission network. In the solutions in question, the determining of the object of interest takes place, however, quite difficultly and uncertainly. If information is available, for example, about targets that are next to and very close to each other, errors may occur in defining the desired target. This will frustrate the user and thus form an obvious usability problem.

In the aforementioned solutions, the shape of the device is applied in the aiming of the object of interest. In U.S. Pat. No. 6,795,768 A1, an arrowhead on the antenna, more generally the alignment shape of the device, is used to achieve the defining of the target. A corresponding principle is also used in US publication 2002/0140745. Such a manner is, however, liable to error and requires the device to be 'aimed' in the full meaning of the word. In other words, the user must point the device towards the target with their arm straight, in order to determine the target to even some extent. If information concerning the target is shown on the display of the device, the device must be brought back into the user's field of vision, to be able to examine the information. Thus, the arm must make back-and-forwards bent-straight movements, if the target cannot be successfully determined the first time.

The invention is intended to create a way of providing information concerning one or more targets, which, from the point of view of the end user, is easy and is particularly applicable for use in portable devices equipped with camera means. The characteristic features of the devices, the methods, the systems and the program products according to the invention are stated in the in the accompanying claims.

In the invention, the target is aimed at, surprisingly, using camera means.

The invention resolves the problems referred to above using a mobile station, or other corresponding portable devices, which are equipped with defining means, for example, for defining the target, for positioning the target, and/or for defining the position of the target. In the case of the invention, the defining means include a digital camera, a compass, a sensor defining the attitude and altitude of the device, and a GPS positioning device. By pointing the target by the device, and more particularly according to the invention by the camera of the device, the desired target can be sought or define the location of the target, by applying the aforementioned defining means.

Once the target has been identified, the device can provide information concerning the determined target. The information can be provided in real time, according to the view formed using the camera means, or on the other hand, only at the request of the user. According to a first embodiment, the information can even be received by the device beforehand, before the user makes an information request concerning the target. According to a second embodiment, the information can be received only in connection with the defining of the target/view, or immediately afterwards. According to one embodiment, the device can also open an internet page relating to the target, or a corresponding address in an information source, to which, for example, a link reference or other element that is light in terms of data transfer compared to the actual information concerning the target, is received as information.

According to one embodiment, all the information can be provided to the user of the device from the same media, in other words, for example, from the display of a mobile station or similar portable device. The use of the invention permits, for the user of the device, a use experience that is very real feeling, because both the target and the information concerning the target are now presented in the same realistic media, as if they are seen 'through' the device.

The invention permits several applications, by means of which numerous advantages relating to the reception of information are achieved. One first application is the reception of information on targets that are aimed at using the aiming means. According to one embodiment, the information can be adapted to the same image information as the target and shown on the display of the device. In that case, the information can be, for example, a link identifier, by selecting which additional information concerning the target can be downloaded to the device. The application of a link identifier achieves the substantial advantage of reduced data-transfer costs, compared, for example, to a case in which the information would be downloaded directly to the device as a result of aiming. Of course, direct downloading is also possible, being in no way prevented by the invention. In addition, information concerning the target can be merged with the image information to form metadata. The image information together with the metadata can also be stored in the device. Thus, it can also be examined afterwards.

A second application permitted by the invention is the finding of a selected person, for example, in a large crown, or the provision of information on a passing vehicle, or more generally the positioning of some mobile target.

The other characteristic features of the invention will become apparent form the accompanying Claims while additional advantages achieved are itemized in the description portion.

Figure 2A:
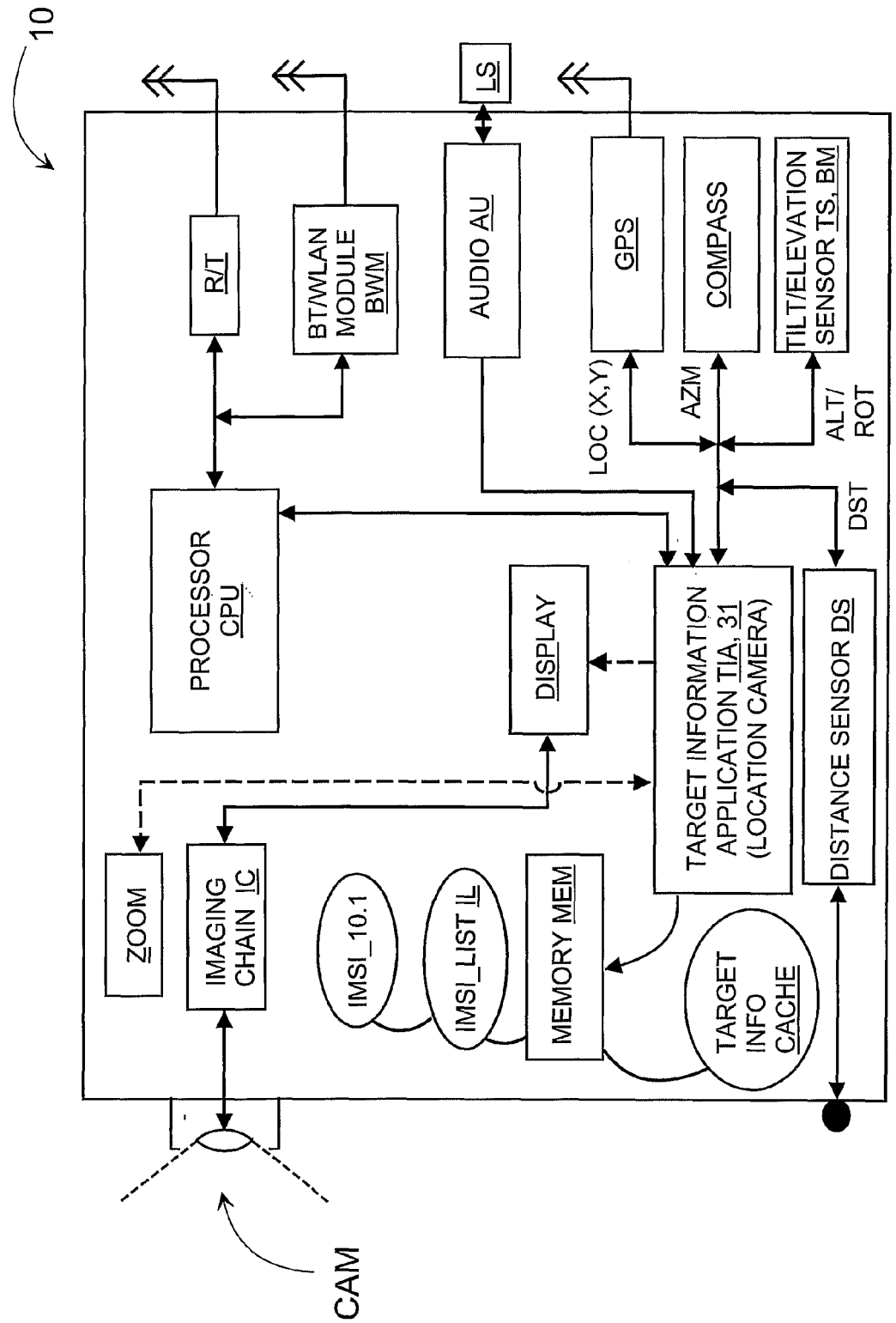
Figure 2B:
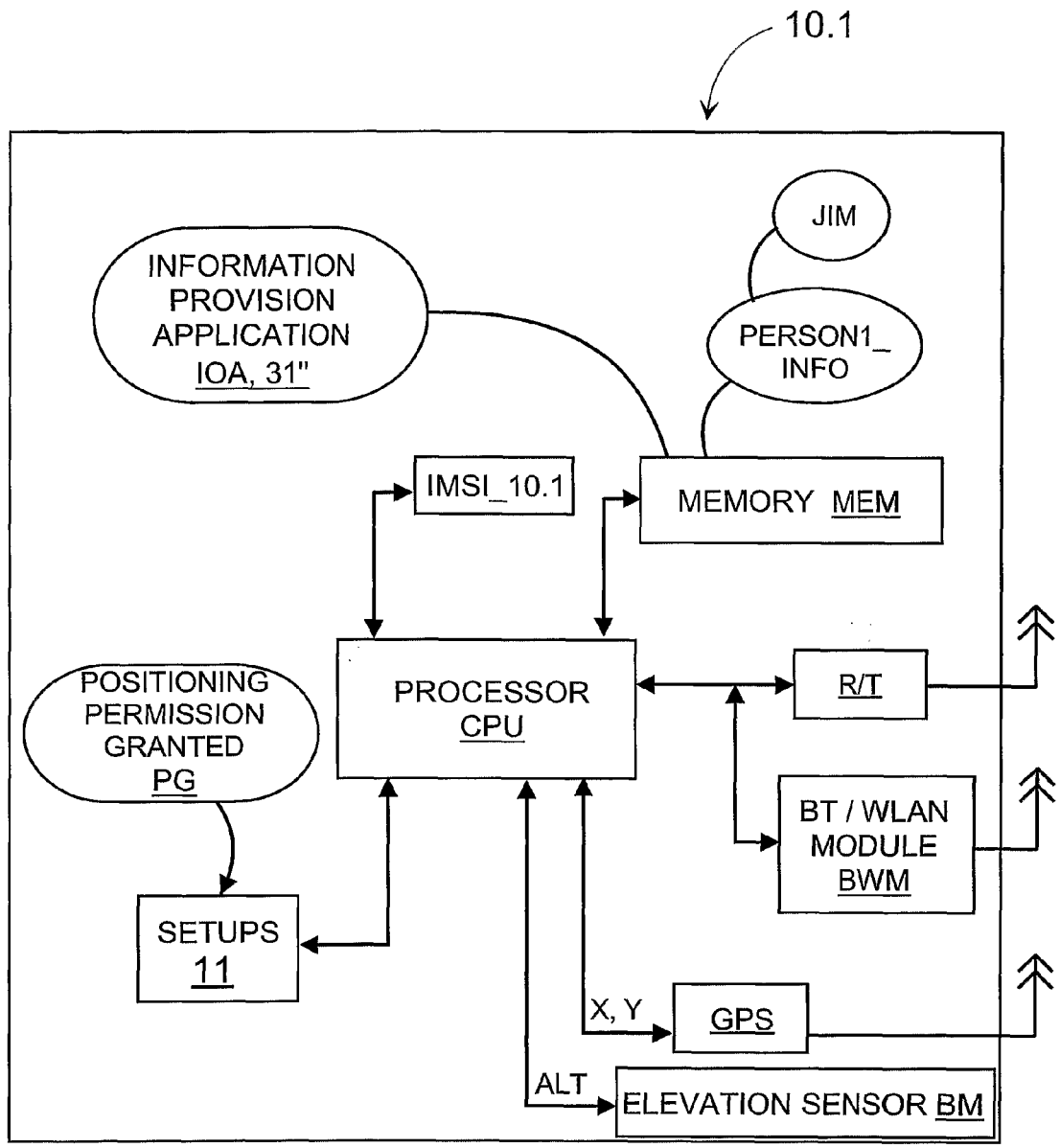
Figure 3A:
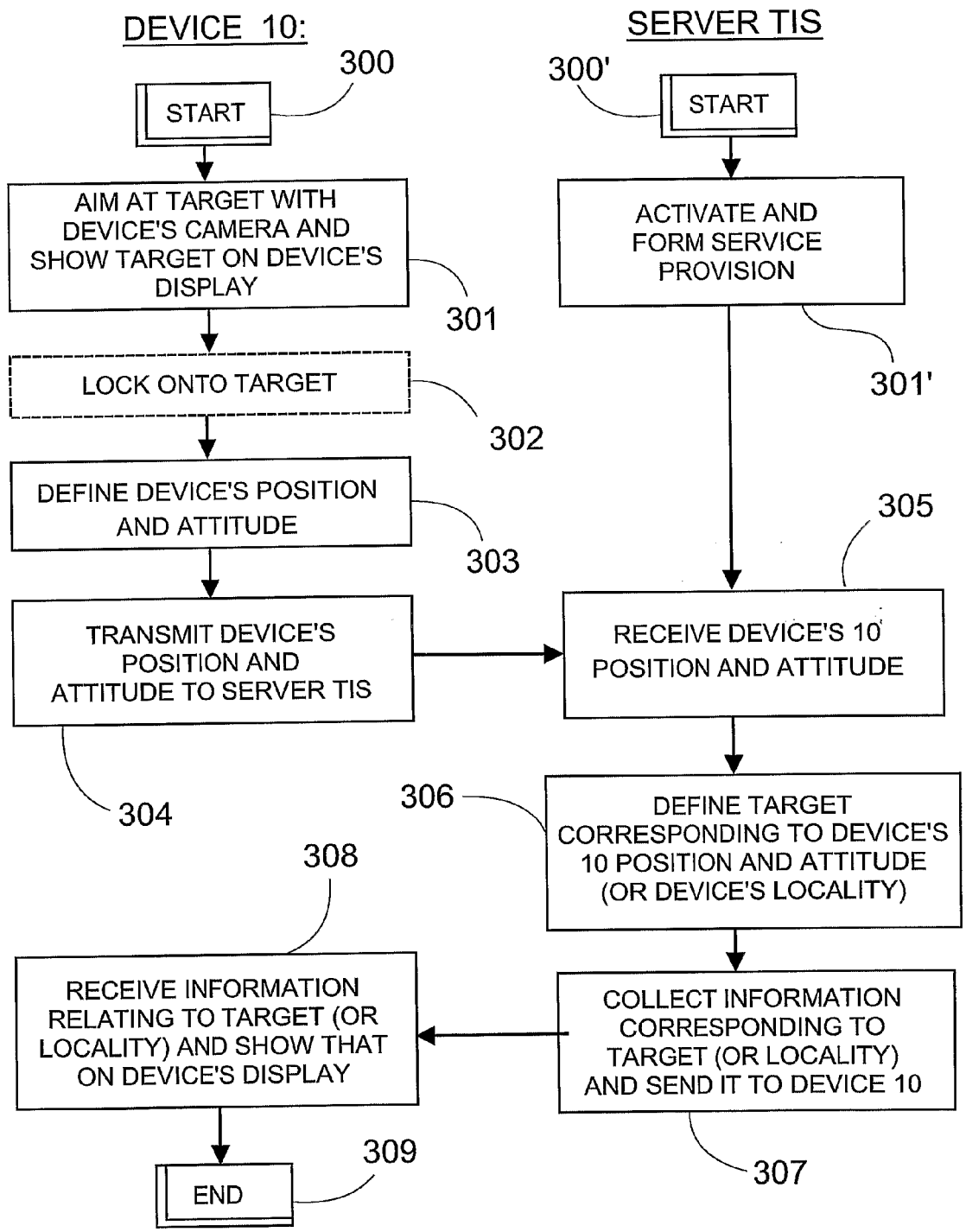
Figure 3B:
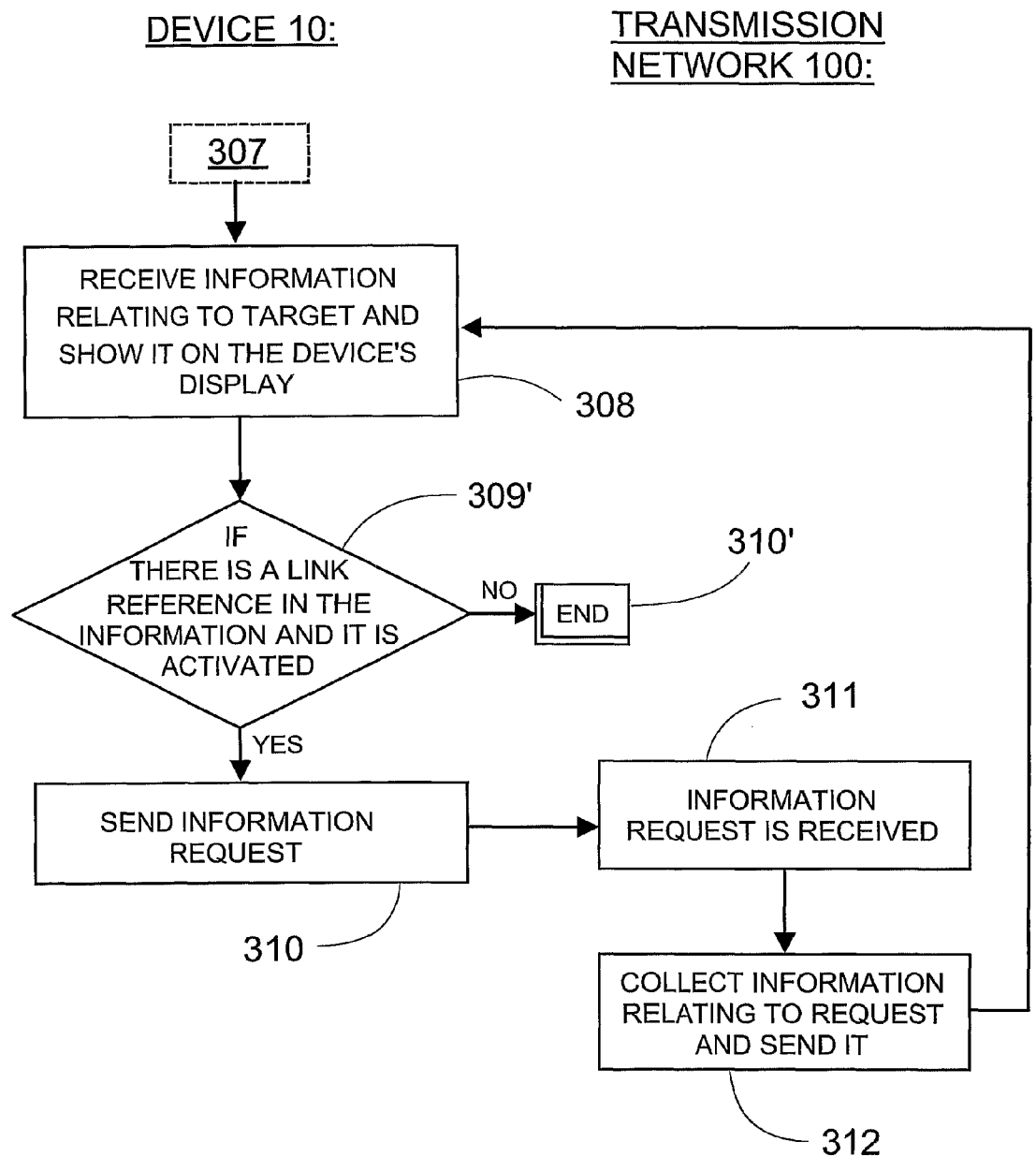
Figure 4A:
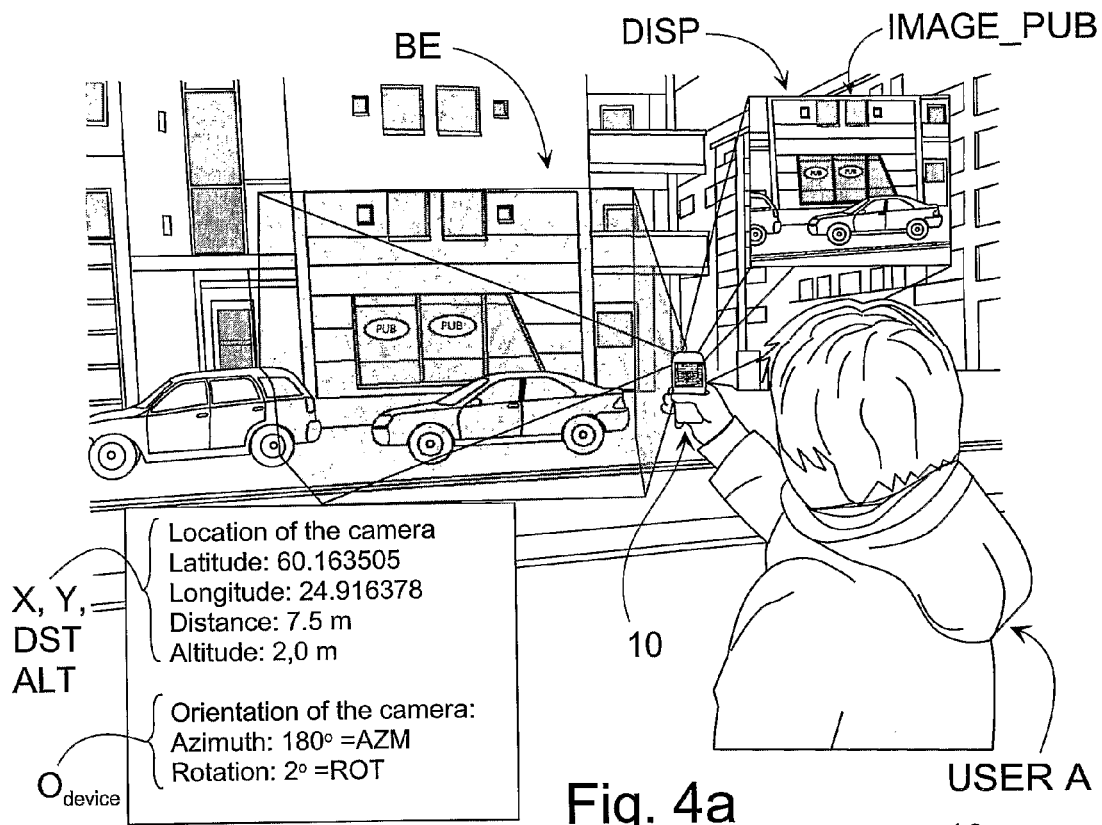
Figures 4B, 4C:
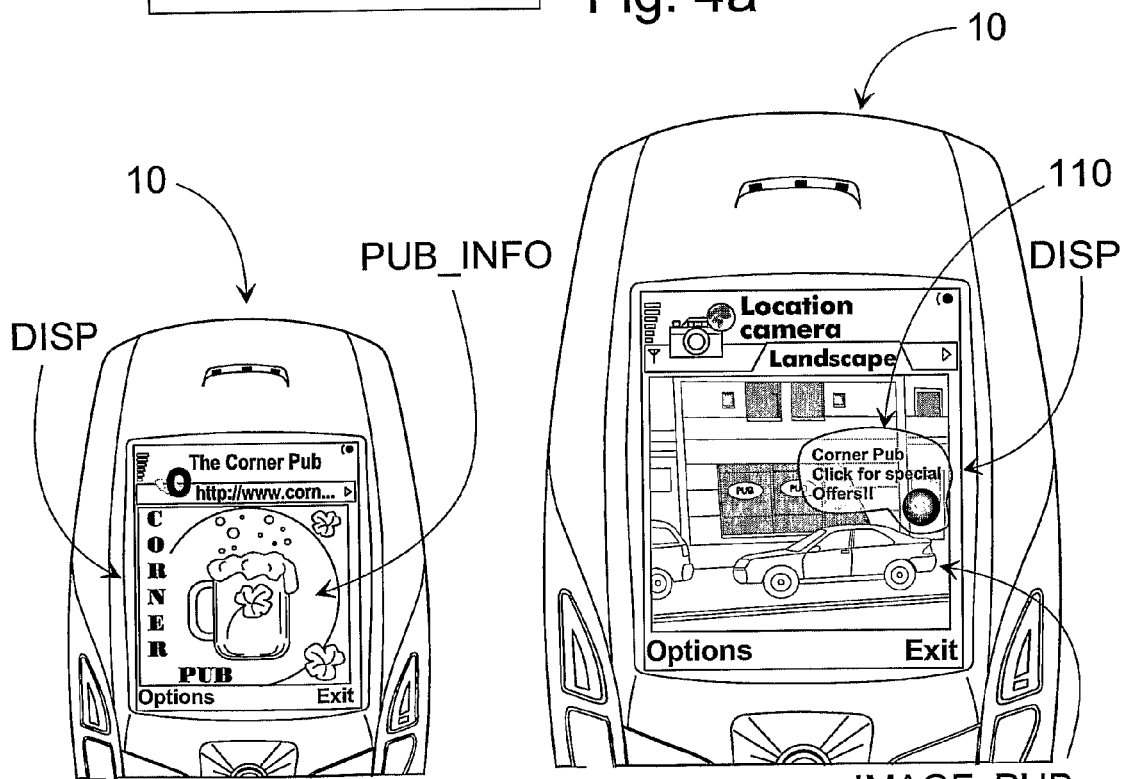
Figure 5:
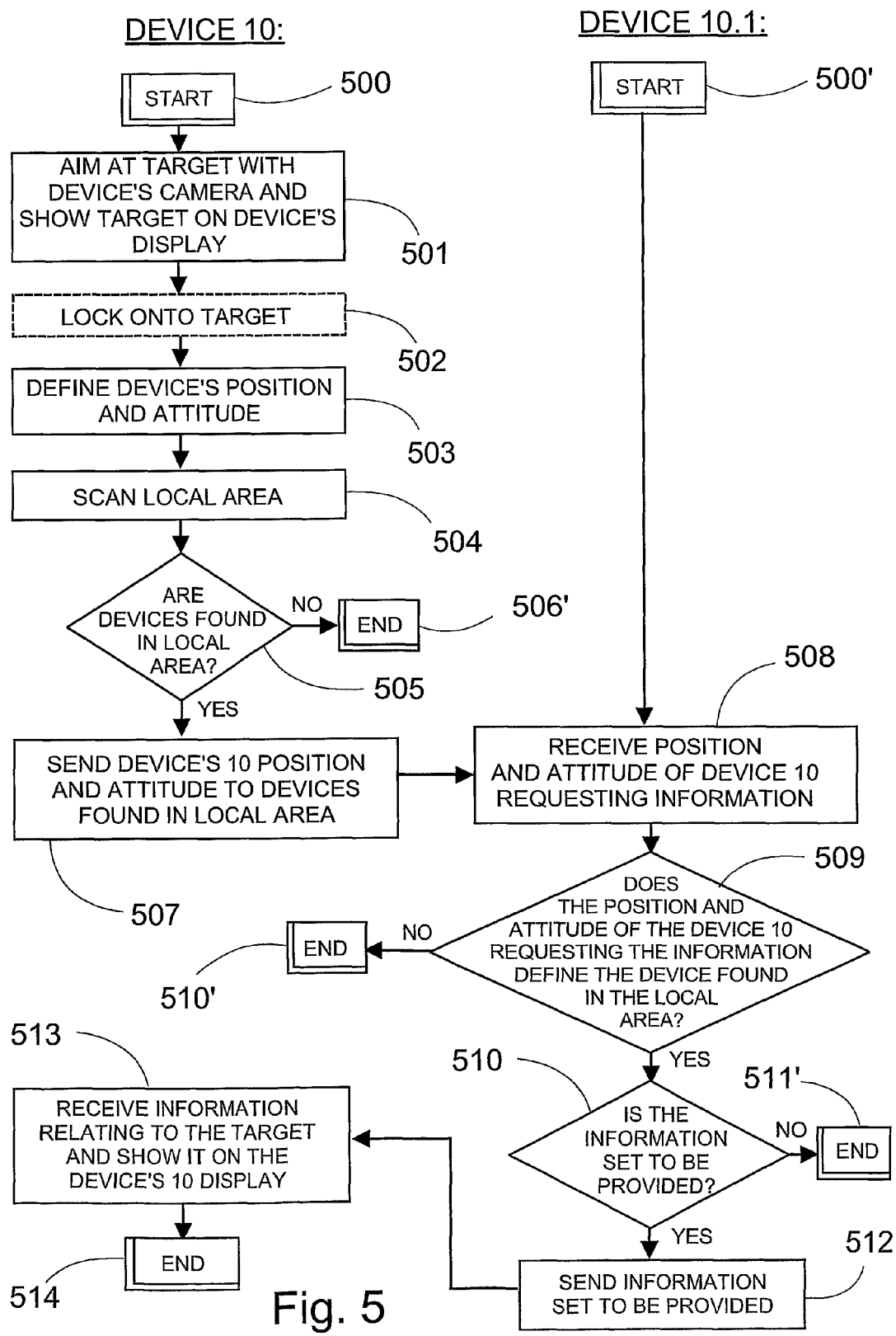
Figure 6A:
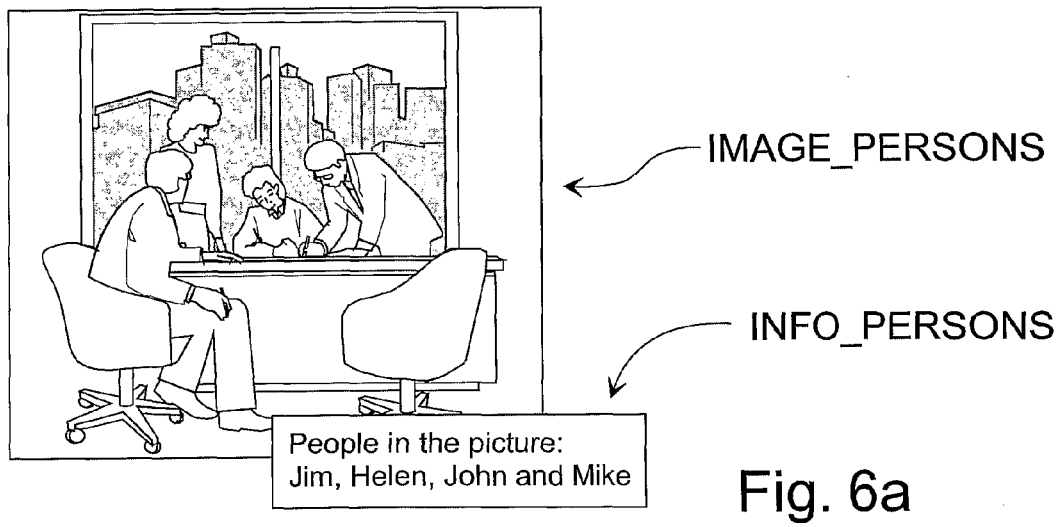
Figure 6B:
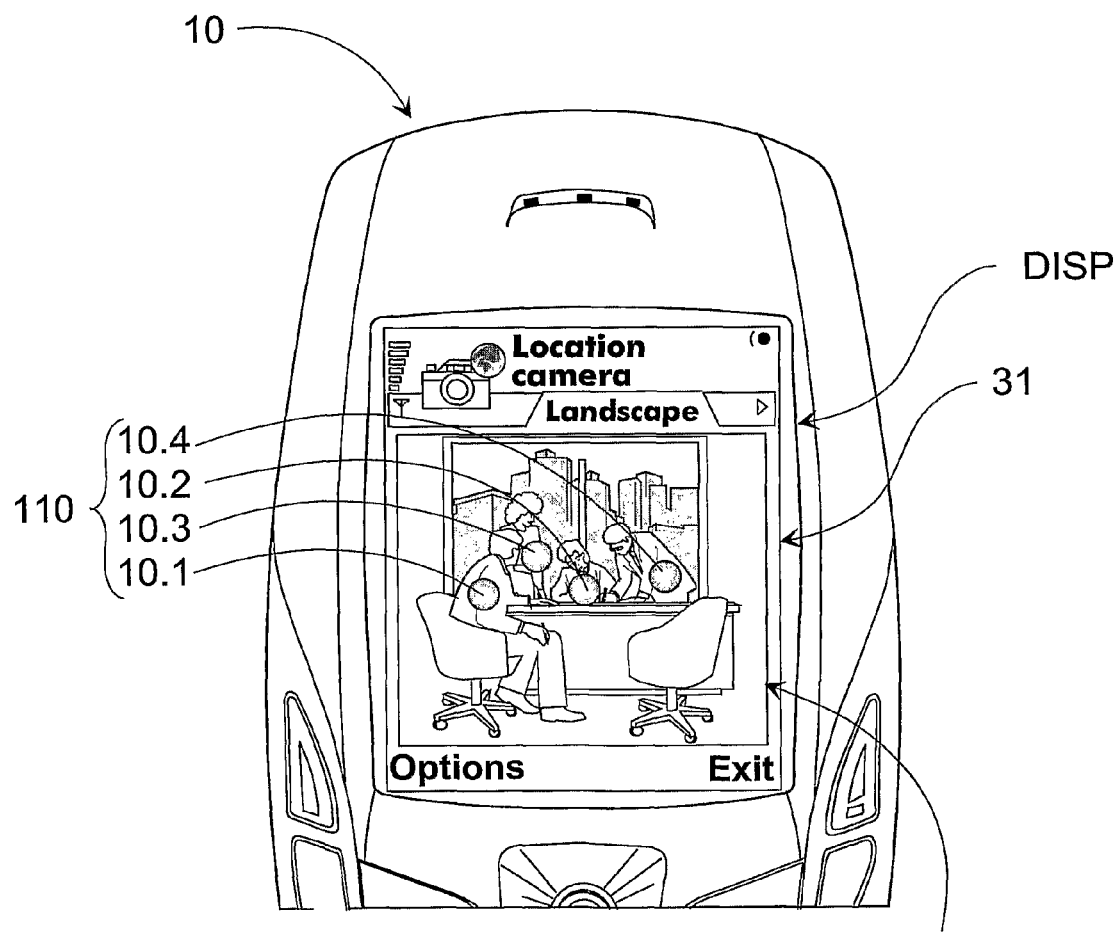
Figure 7:
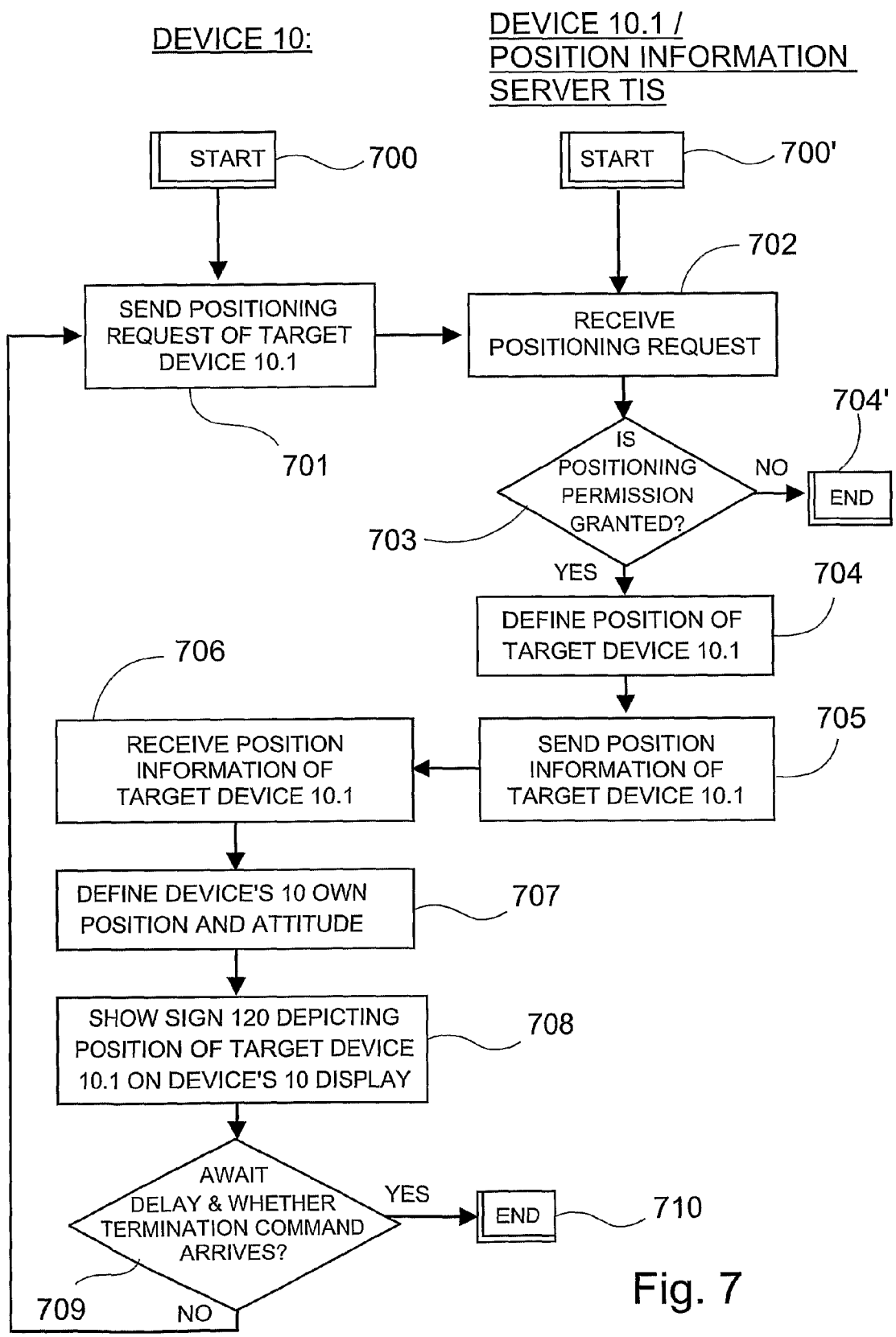
Figure 8:
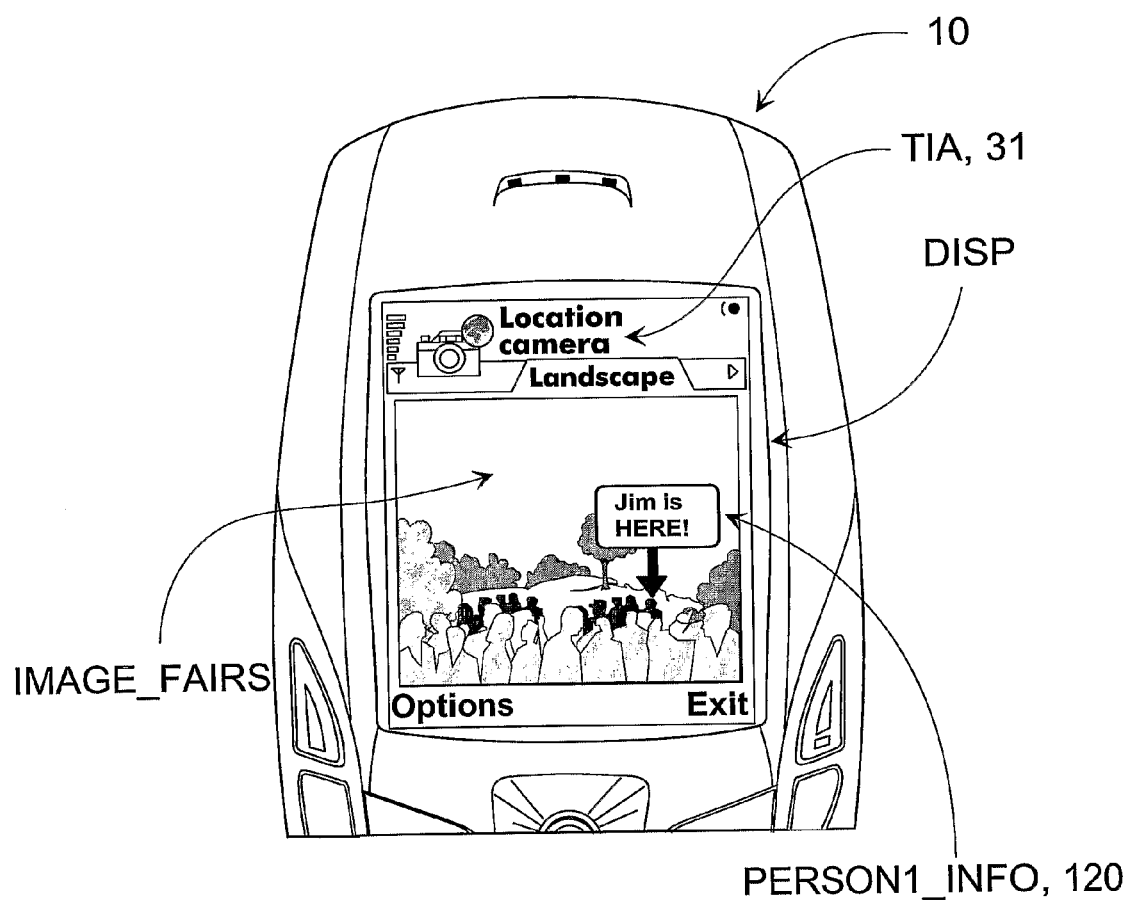
Figure 9A:
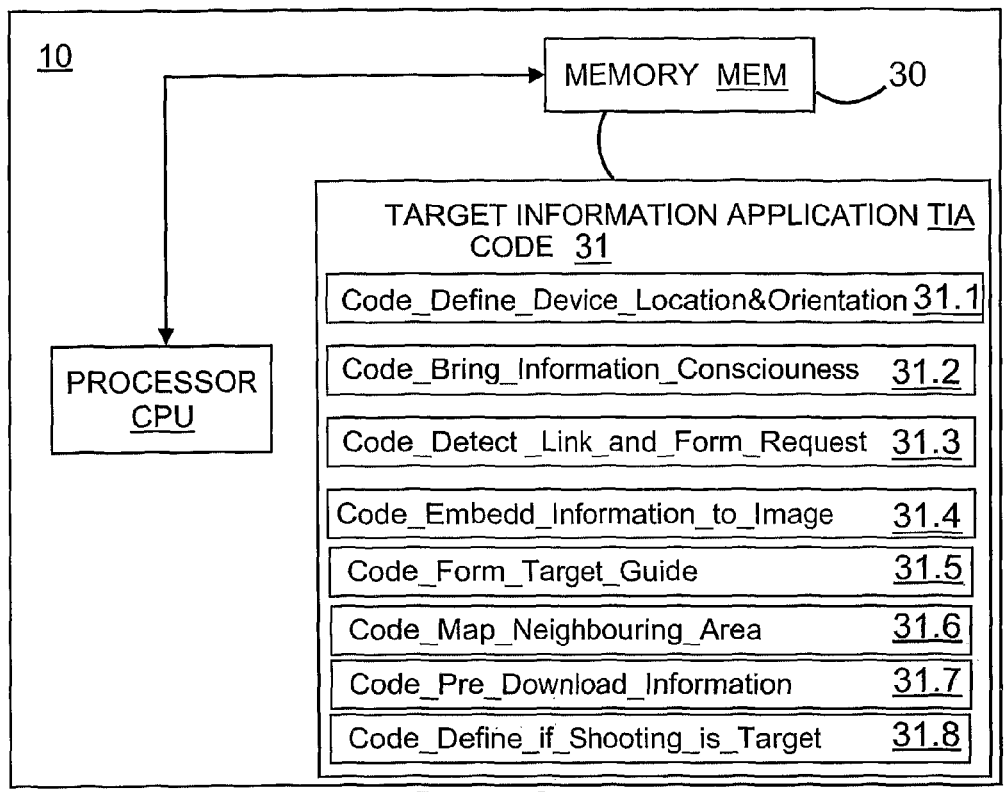
Figure 9B:
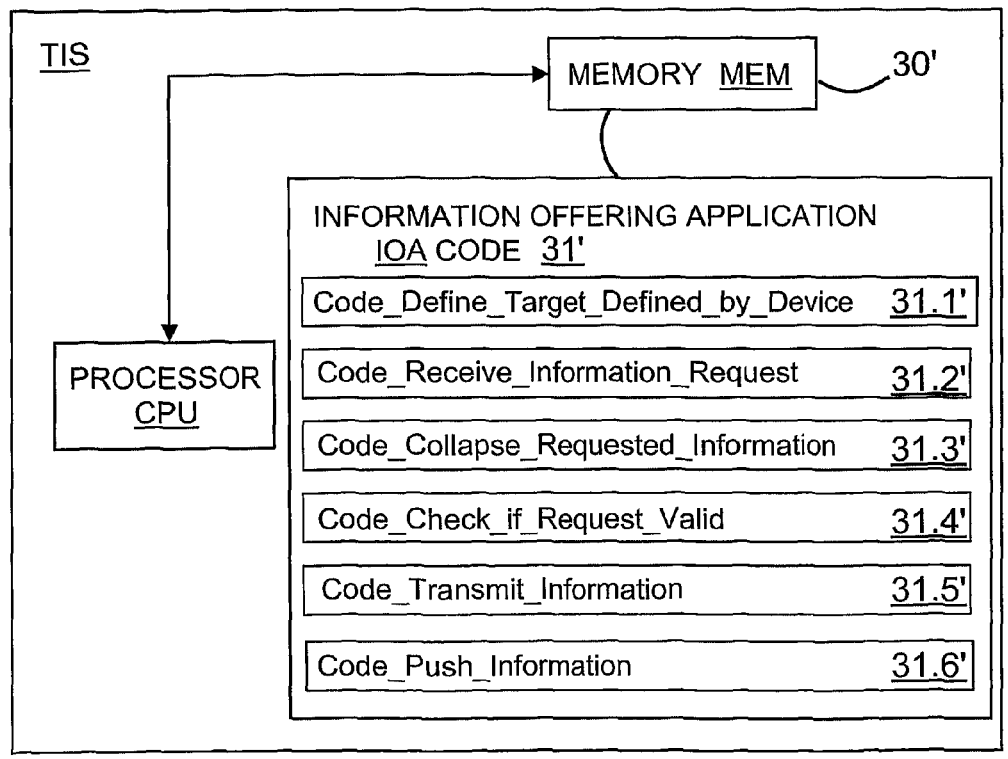
Figure 9C:
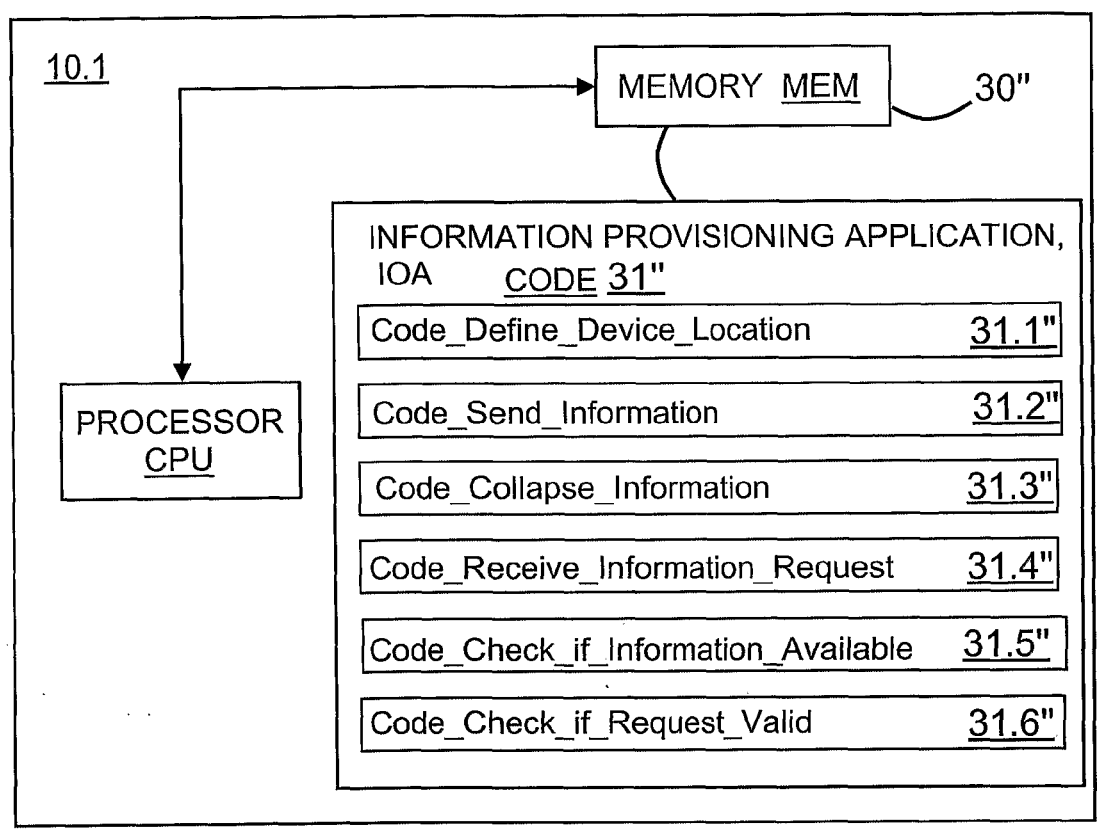

The invention, which is not restricted to the embodiments described in the following, is examined in greater detail with reference to the accompanying figures, in which FIG. 1 shows a rough schematic diagram of one example of the system according to the invention, in different embodiments, FIG. 2a shows a schematic example of an application of a device according to the invention, to which information can be provided according to the method of the invention, FIG. 2b shows a schematic example of an application of a device according to the invention, which can provide information according to the method of the invention, FIG. 3a shows a first example of an application of a first application situation of the method according to the invention, applied to a stationary target, FIG. 3b shows a second example of an application of a first application situation of the method according to the invention, applied to a stationary target, FIGS. 4a-4c show a situation image and device view in the different cases of a first embodiment, FIG. 5 shows an example of an application of a second application situation of the method according to the invention, applied to a possibly moving targets, FIGS. 6a and 6b show a situation image and device view in the case of a second embodiment, FIG. 7 shows an example of an application of a third application situation of the method according to the invention, applied to a search for a target, FIG. 8 shows an image view in the case of a third embodiment, and FIGS. 9a-9c show some examples of applications of program products according to the invention, in different parts of the system.

FIG. 1 shows a rough schematic diagram of one example of the system according to the invention, applied in different embodiments (Street, Office, and Fair). As FIG. 1 shows, the basic idea of the invention is to provide applications for several type situations. Thus the application situations shown in the following, which are to be understood as examples, should in no way be interpreted as restricting the possible scopes of the applications of the invention. FIG. 1 will be returned to in the examination of the various embodiments of the invention.

Defined more precisely, the invention relates to the provision of information about one or more defined targets PUB, PERSON1-PERSON4, for example, in portable devices 10 using camera CAM and the defining means GPS, COMP, TS, BM, DS, MEM of the target PUB, PERSON1-PERSON4. The information provided by the definition means can be understood, in connection with the invention, to be first information X, Y, ALT, $O_{device}$, IMSI_10.1, and information concerning the target PUB, PERSON1-PERSON4, as second information PUB_INFO, PERSON1_INFO-PERSON4_INFO.

FIG. 2a shows a schematic example of an application of the device 10 according to the invention, to which the second information PUB_INFO, PERSON1_INFO-PERSON4_INFO, may be provided according to the method of the invention. It should be understood that FIG. 2a and FIG. 2b, which is examined later, are only rough block-diagram presentations, which have been drastically simplified to explain the basic principle of the invention.

FIG. 2b shows a schematic example of an electronic device 10 according to the invention. The device 10 can be, for example, a mobile station, or a similar smart communications device. In this case, the device 10 is equipped with suitable transmission means R/T, BWM, by means of which the device 10 can communicate with other devices 10.1-10.4, which are able to communicate in one or more wireless transmission networks 100, BWA. A transmission network can be, for example, a mobile network 100 and/or a wireless local area network, such as a Bluetooth or WLAN (Wireless Local Area Network) network BWA (FIG. 1).

Because the device 10 can be used to provide its user USER A with information PUB_INFO, PERSON1_INFO concerning selected, set, or aimed at target PUB, PERSON1, at least one first source GPS, BM, COMP, TS of information X, Y, ALT, $O_{device}$, is arranged in connection with it, to define the target PUB, PERSON1 relative to the device 10 in a set manner. The relationship between the data X, Y, ALT, $O_{device}$ of the sources GPS, BM, COMP, TS of information and the attitude of the device 10 is fixed, for example, by program means 31.1, in such a way that, when the device 10, or more particularly its camera CAM is directed in a specific way, the data X, Y, ALT, $O_{device}$ in question states the direction of orientation of the device 10. Thus, when the device 10 is in a specific orientation relative to the selected/set/aimed at target PUB, PERSON1-PERSON4, the information sources GPS, BM, COMP, TS produce a specific type of information, which corresponds to the location of the device 10 and its orientation relative to the target PUB, PERSON1-PERSON4.

On the other hand, in certain embodiments of the invention, the device 10 is attempted to be placed in a specific orientation relative to the selected target PERSON1. In that case, by altering the attitude and orientation of the device 10, an attempt is made to make the data X, Y, ALT, $O_{device}$ produced by the information sources GPS, BM, COMP, TS to be desired, even more particularly, an attempt is made to direct the camera CAM of the device at the target PERSON1. Through such an embodiment, a selected target PERSON1 can be sought according to the method of the invention.

The first information can include several different types of information. Some examples of these are the absolute geographical positioning information of the device 10 (coordinates LOC(X, Y) X=Latitude, Y=Longitude and the altitude information ALT of the device, for example, relative to the surface of the ground or some other selected reference). The information $O_{device}$ defining the attitude of the device 10 can also consist of several sets of information. These can include, for example, the absolute orientation information AZM of the device 10 and the absolute attitude information ROT of the device 10 relative to the selected target PUB, PERSON1. If the data X, Y, ALT, AZM, ROT produced by the information sources GPS, BM, COMP, TS are fixed to the reference attitude of the device 10, such information can be used to determine the direction in which the device 10 is oriented, from which point in space the orientation has taken place, and which target PUB, PERSON1 is intended by the device 10.

The device 10 includes at least a source GPS, BM, R/T, COMP, TS of location and orientation information X, Y, ALT, $O_{device}$, for at least defining the position of the device 10 relative to the selected/aimed at target PUB, PERSON1, or, on the other hand, also for positioning a selected target PERSON1 relative to the device 10. The source of positioning information X, Y, which can, according to one embodiment, be a satellite positioning system GPS, can be used to determine at least the position of the device 10 relative to the selected/aimed at target PUB, PERSON1. Mobile-station positioning based on wireless network technologies can also be considered, either by itself, or to assist GPS positioning. GPS positioning can be either fixed in the device 10, or it can also be a wireless GPS module, which can be linked to the device 10 by applying a set protocol (not shown). The source of positioning information can also be a sensor BM determining the altitude position ALT of the device 10. It can be based, for example, on an air-pressure meter (altimeter/barometer).

Further, the source of the orientation information of the device 10 can consist of, for example, a (3D) compass COMP, by means of which the alignment AZM of the device 10 and the attitude of the device 10 can be determined, such as, for example, a (3D) tilt sensor TS, which detects the degree of tilt ROT, or a (3D) acceleration sensor, or even a camera CAM. The technical implementations of these are quite obvious to one versed in the art, and there is no need to deal with them further in this connection. Large numbers of examples of their implementation can be found, for example, in the reference publications referred to in the portion describing the prior art. The data AZM produced by the compass COMP can be digital degree-reading data. The orientation of the device 10 can be determined on its basis. The data ROT produced by the tilt sensor TS can also be measured in degrees and in the direction of tilt (downwards, upwards).

On the other hand, the information X, Y, ALT, $O_{device}$, produced by the sources GPS, BM, COMP, TS can also, according to a second embodiment, be used to position a selected target PERSON1, relative to the device 10. Such an embodiment can be considered, for example, if the position of the target PERSON1, in which the user USER A is interested, is not known to the user USER A and it is precisely that which it is intended to determine according to the invention.

Yet another application example of the first information and its source is the identification of the target PERSON1 being positioned, for example, their mobile-station subscriber identifier IMSI_10.1 and a memory module MEM suitable for storing this. The memory module MEM can be permanently in the device 10, or, for example, a SIM module (Subscriber Identity Module). The memory MEM can contain a phonebook IMSI_LIST IL, which is as such known, in which the user USER A can store, in a known manner, the set of mobile-station numbers IMSI_10.1-IMSI_10.4 of the people PERSON1-PERSON4 they wish, in order to be able to contact them through a selected communication network 100, BWA.

Further, the device 10 also includes a processor unit CPU or a corresponding processor functionality. This is used to manage the operation of the device 10 in a manner that is, as such, known from the processor environments.

In addition, the device 10 includes aiming means CAM, DISP, for positioning the target PUB, PERSON1 relative to the device 10, in a set manner, for example, for defining the target PUB, or for searching for the target PERSON1. According to one embodiment, the aiming means can surprisingly form imaging means CAM, such as, for example, a digital camera totality, which is as such known, together with an image-processing chain IC. The camera CAM can also be used to form image information IMAGE_PUB of the target PUB that is selected/aimed at, relative to which target PUB the device 10 can be aligned in a set manner, in other words, so that the target PUB can be aimed at using the camera CAM of the device 10.

The aiming means can additionally include viewfinder means DISP, in other words, the viewfinder of the camera CAM. According to one embodiment, the viewfinder, which can be, for example, the display element DISP of the device, can be used to bring the image information IMAGE_PUB formed from the target PUB by the camera CAM to the attention of the user USER A of the device 10.

In the following, the method according to the invention is described with reference to certain examples of applications. In the method flow diagrams presented in FIGS. 3a, 3b, 5, and 7 are referred to a schematic application example of the electronic device 10 according to the invention, shown in FIG. 2a, in which it is illustrated as a rough block diagram, describing the significance of the operational components of the device 10, in the context of the invention. In addition, reference is made to the program products 30, 30', 30" shown in FIGS. 9a-9c, by means of which the method according to the invention can be implemented in the system 10, 10.1-10.4, TIS (FIG. 1) according to the invention.

Embodiment Street

In the Street application shown in FIGS. 1 and 3a, the user USER A of the device 10 wishes to know whether the commercial enterprise PUB located on the street STREET, which in this case can be understood to be the selected or aimed-at target, provides some kind of second information PUB_INFO, which would be available in the manner characteristic of the invention. The enterprise can be, for example, a shop or a restaurant, the supply or services offered by which interest the user USER A. The stages of the method are described in the flow diagram of FIG. 3a. In addition, reference is made to the situation image shown in FIG. 4a and the device views shown in FIGS. 4b and 4c, in different cases of this first embodiment. The performance of the method starts from stage 300, in which the user USER A can activate the target information application TIA (Location Camera, 31) from the device 10, which name can be applied, by way of example, to the functionality arranged in the device 10, in the case of the application example. At this point it should be stated that the invention also relates to a program product 30, which can be performed at least partly at a software level in the device according to the invention 10. The code means 31.1-31.8 of the program code 31 belonging to the program product 30 are examined in greater detail slightly later in this description.

The target information application 31 can be activated, for example, from the user interface UI, or it can also be active by default already, for example, when the device 10 is switched on, or the camera application is initiated.

In stage 301, the user USER A aligns their device 10 relative to the target PUB in a set manner. In this embodiment, the user USER A is next to i.e. in the immediate vicinity of the target of their interest PUB and thus they have visual contact with the target PUB that they have selected. According to the main principle of the invention, the user USER A then aims at the street-side enterprise PUB, using the device 10, and more particularly the camera CAM and viewfinder DISP (FIG. 4*a*). Because, in the case according to the embodiment, the user USER A is already in real or virtual (for example, there is some obstacle partly in front of the target) visual contact with the target PUB, the aiming operation now occurs as nearly the first of the sub-stages of the method.

As a result of the aiming sub-stage 301, image information IMAGE_PUB is formed from the target PUB. To bring this to the attention of the user USER A, the image IMAGE_PUB can be shown on the display element DISP of the device 10. Once the image information IMAGE_PUB is in the viewfinder DISP, the device 10 is then aligned relative to the target PUB in a set manner. Next, the user USER A can trigger the functionality according to the invention. Triggering can take place, for example, in such a way that, when the target information application 31 is active, all operations directed to the camera CAM, for example, those forming image capture or other similar operations, are regarded as a target-information-service request.

In stage 302, an operation corresponding to the triggering of the camera CAM leads, as the next stage 303, to the definition of the positioning information X, Y, ALT and the orientation information $O_{device}$ of the device 10 by the defining means GPS, COMP, TS used for defining the target PUB, and locking. Stage 302 may be optional. It is not essential, if the application TIA is, for example, set to provide information of the target PUB in the view detected by the camera CAM, in a continuous manner, without separate requests. This embodiment is examined in greater detail towards the end of the description. FIG. 4*a* shows an example of the sets of information X, Y, ALT, $O_{device}$. The reference definitions of these sets of information X, Y, ALT, $O_{device}$ relative to the attitude corresponding to the aiming of the device 10, are set to be such that the target PUB, which is defined by the aiming operation of the user USER A and is also in the image information IMAGE_PUB at that moment, is known from them.

In stage 304, the device's 10 position and attitude information X, Y, ALT, $O_{device}$, which defines the target PUB, in general at least part of the first information, such as, for example, the device's 10 own location and orientation, can, according to one embodiment, be sent to a target-information server TIS arranged in a transmission network 100. The concerned first information can also include information of the width of the image angle detected by the camera CAM. Starting from stage 300', the server TIS has been used to run a service provision IOA, which receives information requests, collects second information on the basis of the requests, and sends it to the device 10 that has requested it. As stage 305, the server TIS receives the information X, Y, ALT, $O_{device}$ (code means 31.2') defining the target PUB and sent by the device 10 and, in stage 306 defines, from a database TdB the target PUB, about which the user USER A wishes information PUB_INFO, which corresponds to the received information X, Y, ALT, $O_{device}$ (code means 31.1').

It must be understood, that the sub-stages 305 and 306 can also include, as can the other sub-stages of the method, sub-sub-stages that it has not been regarded as necessary to show in the flow diagrams, for instance because they are self-evident. According to one embodiment, the server TIS can, of course, be used to first of all check whether second information PUB_INFO on the defined target PUB has generally been set to be provided. If information to be provided is not found (i.e. it has, for example, not been provided at all for the target PUB), or if some problems arise in the definition of the target PUB (the target PUB cannot be defined, for example, due to the wrong positioning of the device 10), it can notify this to the device 10 of the user USER A who has requested the information and can terminate the sequence of operations at this point.

The targets PUB defined in the database TdB can include not only information PUB_INFO set to be provided, but also geographical location information PUB_LOCATION of the target PUB, as well as its spatial nature. Thus, if the user USER A aims their device 10, for example, at a skyscraper and more particularly at its upper part, the target can then be defined sufficiently explicitly. The calculation relating to the definition of the position of the target PUB can be performed either in the device 10, or only in the server TIS, or partly in both. If the calculation is already performed in the device 10, then in stage 304 to the server TIS is sent some spatial-mathematical element, instead of or as well as the position and orientation information X, Y, ALT, $O_{device}$ defining the target PUB. Some examples of this can be a straight line S, a sector SEC, a beam BE, or some other spatial element defining the position of the target PUB, which defines the target PUB (FIG. 1). One example of the determination of such an element is the aforementioned data stating the image angle of the camera CAM. This can refer to how wide an area can be seen through the optics of the camera CAM (for example, 45 degrees). There are thus numerous definition alternatives. The defining of the position of the target from an image IMAGE_PUB, IMAGE_PERSONS can be performed, for example, by applying some known vector-calculation method. The calculation of the element L, SEC, BE and the definition of the target PUB on the basis of it can, of course, be performed, instead of or as well as in the device 10 also in the server TIS, which can provide perhaps more powerful resources for performing complex calculations.

The server TIS can be in the possession of, for example, a network operator, a service operator, a service provider, or some similar reliable third party, who can sell a service according to the invention to the user USER A and correspondingly information PUB_INFO, LIBRARY_INFO, RISTORANTE_INFO, SHOP_INFO to parties set to provide it. The setting of the information INFO_PUB for provision can take place in ways that are, as such, known, for example, from web technologies.

If the target PUB can be defined in stages 305 and 306, then in stage 307 the initial information PUB_INFO arranged in the database TdB, or information intended to be sent as a corresponding initial request is collected (code means 31.3') and transmitted (code means 31.5') over the transmission network 100 to the device 10 that has ordered the information. The device 10 receives the second information PUB_INFO concerning the target PUB in stage 308 with its data-transfer means R/T and bring it to the attention of the user USER A. It can be brought to the attention of the user, for example, on the display DISP of the device 10, using, for example, program means 31.2 (FIG. 4*b*). On the other hand, the information can include, instead of or as well as visual information to be shown on the display, also audio data, in which case it can be relayed to the user USER A by the sound-reproducing and loud-speaker means AU, LS of the device 10.

Relating to stage 308, according to one embodiment, the second information PUB_INFO relating to the target PUB can also, for example, using code means 31.4, be merged with the image information IMAGE_PUB shown on the display DISP of the device 10. Such an embodiment is shown in FIG. 4c. In it, one the information PUB_INFO has been received, the camera CAM can be switched off and the information PUB_INFO, which has been received as packet data, for example, in MMS format (Multimedia Messaging System), is brought to the display DISP as metadata of the image IMAGE_PUB.

On the other hand, the camera CAM can even be still switched on, imaging the view IMAGE_PUB in real time on the display DISP, with which the received information PUB_INFO is mainly immediately merged. This embodiment permits a particularly tangible user experience, a kind of 'digital shop window'. In it, sets of information PUB_INFO relating to one or more targets in the image IMAGE_PUB are merged with the real-time image information IMAGE_PUB formed using the camera CAM, in a surprising manner by 'layering'.

A third alternative is the activation of the browser application of the device 10 and the presentation in it of information PUB_INFO concerning at least one target PUB (FIG. 4b). In that case, the information PUB_INFO can include, for example, in addition to text and images, also other content (links, etc.) to be examined in the browser.

If there is only one target PUB in the image information IMAGE_PUB in the display DISP of the device 10, i.e. the definition of the target PUB, according to the invention, performed by the device 10, is unambiguous, the information PUB_INFO can be located, for example, at some edge or in some corner of the display component DISP. The camera CAM can then be used to continue to image the target PUB while at the same time received information PUB_INFO, which is thus now merged with the image information IMAGE_PUB of the viewfinder DISP, is also shown on the display DISP along with the image IMAGE_PUB (FIG. 4c). It is also possible to store the image IMAGE_PUB in the memory MEM of the device 10, in which case the information PUB_INFO and/or also information added by the user USER A themselves is present in the image IMAGE_PUB. In its basic form, the procedure can terminate at stage 309.

FIGS. 3b and 4c show an embodiment, which can be envisaged as continuing from the flow-diagram block 307 of FIG. 3a. The initial information PUB_INFO of the target PUB, received by the device 10 from the transmission network 100 can, according to this embodiment, include, for example, at least one link identifier 110, more generally a content reference, referring to the transmission network 100. The use of the embodiment achieves, for example, the advantages that, if there is a very great deal of information PUB_INFO relating to the target PUB, then the user USER A can download additional information to the device 10 only if they want to. This is particularly important in a situation, in which the user USER A must pay for the data that they receive with the device 10, of which there may be, in the case of some target, considerable numbers of bytes.

According to FIG. 4c, in stage 309' the link identifier 110 can be identified from the initial information PUB_INFO received in stage 308, for example using code means 31.3 and shown on the display DISP, for example, merged with the image information IMAGE_PUB formed from the target PUB and/or stored as metadata in the image information IMAGE_PUB, which can be further stored in the memory MEM of the device 10 in a re-readable manner. If in stage 309' the user USER A activates the link identifier 110 referring to the target PUB, this will lead to the formation of an information download request as stage 310, which, in a manner that is as such known, be formed using the same code means 31.3 and then sent by the transmission means R/T of the device 10 to the transmission network 100 for downloading additional information concerning the target PUB to the device 10. The request can be addressed to the server TIS, or even to a service address located elsewhere in the transmission network 100 (internet). Thus, this is largely a similar type of situation to normal data-network browsing. As a result of the activation of the link reference 110, the server TIS receives, as stage 311, the information request, as stage 312 collects the information defined by the link 110, which can further include link references, or generally content known by browser use, and send it in stage 312 to the device 10 (code means 31.3', 31.5'). The browsing procedure 308-312 is continued, until the loop reaches its end 310', for example, in the form of the passivation of the application 31, TIA with respect to the relevant target PUB.

The use of the embodiment applying a link identifier 110, or in general a content address referring to the transmission network 100, achieves a significant advantage also in such cases, in which the image information IMAGE_PUB may include several targets, on which second information according to the invention is set to be provided. Thus, the device's 10 position and attitude information X, Y, ALT, $O_{device}$ can define several targets. Instead of heavy content including even, for example, image information being downloaded as initial information for each target defined by the device 10, the downloading of only the link identifiers 110 will bring savings in data-transfer costs. After all, the user USER A may only want information on a single target PUB, so that information concerning other possible targets in the image information IMAGE_PUB will be completely irrelevant. The use of link identifiers 110 will eliminate this problem too, because the size of the link identifiers 110 (a few kilobytes) is completely insignificant compared, for example, to other content that can be transferred in the network (for example, image and text-data content of tens or even hundreds of kilobytes).

According to an even more developed embodiment, zooming Z performed with the camera CAM can also surprisingly be applied to the more precise definition of the target, but this embodiment will be returned to later in the description. Naturally, it is also possible to apply distance measurement DS.

Embodiment Office

The OFFICE embodiment shown in FIGS. 1, 5, which is also referred to in FIGS. 6a and 6b, shows a second possible embodiment of the invention. In it, the target of the interest of the user USER A of the device 10, i.e. the selected target, is one or more persons PERSON1-PERSON4 in the image information IMAGE_PERSONS, at least some of whom may be equipped with a portable communication device 10.1-10.4. For example, when entering an office room, the user USER A may be interested to know whether some second information PERSON1_INFO-PERSON4_INFO, which would be available in a manner characteristic of the invention, concerning persons PERSON1-PERSON4 who are previously unknown to them, would have possibly been set to be provided.

Even though in this case the targets PERSON1-PERSON4 are stationary in the office room, the embodiment is closely related to the positioning of mobile targets. Instead of the persons PERSON1-PERSON4, the target could equally well be, for example, a transporter belonging to a courier company and moving on the street, a ship of a company that organizes cruises, or a mobile hotdog stand. These forms of transportation are then equipped with means according to the invention and with information, which will be described in greater detail when examining FIG. 2b.

In this application, the stages 500-503 can correspond to the stages 200-203 in the previous embodiment. As the following method stage 504, a survey, search, i.e. scan of the local area can be performed. In it, the local-area means BWM of the device 10 are used to check, in a manner that is as such known, whether there are in the vicinity of the device 10, even more particularly in the direction defined by its current alignment X, Y, ALT, $O_{device}$, possibly any such devices 10.1-10.4 shown in FIG. 2b, which would be equipped with corresponding local-network properties BWM. If devices corresponding to the call are not found, the procedure terminates at stage 506'. Code means 31.6 in the program code 31 can be responsible for this functional totality.

However, if devices 10.1-10.4 of this kind, for example, shown on a schematic block-diagram level in FIG. 2b are found, and even more particularly, if they are set to provide personal information PERSON1_INFO-PERSON4_INFO, data transfer of this information that is set to be provided is performed from the one or more devices 10.1-10.4 that are the target(s) of interest to the device 10 that is interest in the information PERSON1_INFO-PERSON4_INFO that they provide.

FIG. 2b shows one individual example of such a device 10.1-10.4, which may be set to provide information PERSON1_INFO-PERSON4_INFO concerning its user PERSON1-PERSON4. The device 10.1 can be a mobile station that is, as such, known, such as the device 10 that has already been described previously. It is equipped, for example, with similar transmitting/receiving means R/T, BWM in order to permit communication in one or more transmission networks 100, BWA. Even if there are no camera means at all in the device 10.1, it can nevertheless be part of the system according to the invention by providing information to devices that include aiming means. It will be obvious to one versed in the art that such a device is also, of course, possible, in which there are the functions of both the device 10 and the device 10.1, even though it is not separately shown in the figures.

According to one embodiment, as stage 507 the device 10 can send its position and attitude information X, Y, ALT, $O_{device}$ to the devices 10.1-10.4 that have responded to the call. Because the devices 10.1-10.4 have permitted in their settings 11 positioning (PG) according to the invention and, as a result of stage 500' they are ready to receive the relevant position and attitude information X, Y, ALT, $O_{device}$, as stage 508, they receive first information X, Y, ALT, $O_{device}$ sent by the device 10 concerning the orientation of the device 10 (code means 31.4"). After the receiving sub-stage 508, on the receiving device 10.1-10.4 can be performed an operation stage 509 corresponding to that performed in stage 306 by the server TIS. In it, function IOA, 31" arranged in the device 10.1-10.4 are used to check whether the position and attitude information X, Y, ALT, $O_{device}$ of the device 10 requested the information PERSON1_INFO-PERSON4_INFO corresponds to the target device 10.1-10.4 in question. In other words, in stage 509 a check is made, for example, by software using the code means 31.1" (if TIS, then 31.1') whether the user USER A is aiming their device 10 at all at the person PERSON1-PERSON4 in question. Of course in that case the defining means GPS, BM of the position of the device 10.1 will define the device's 10.1 own position (code means 31.1").

If the device 10.1-10.4 is not on the aiming line, sector, or beam, or other such, the procedure then stops at stage 510' in the case of the device that has been shown to be not the intended one. On the other hand, if in stage 509 the function IOA determines that the device 10.1-10.4 is indeed on the aiming line of the device 10, the procedure moves to stage 510. In it, code means 31.5" in the device 10.1-10.4 can use software to check whether the user PERSON1-PERSON4 in question has at all set personal information PERSON1_INFO-PERSON4_INFO to be provided and to whom it may be provided. For this purpose, there is a flag PG in the settings 11 of the target device 10.1-10.4 notifying the state of a positioning permission. The flag PG can be set to permit positioning/information provision, for example, device-specifically, operator-specifically, or even to all devices that request information (code 31.6").

If positioning permission has not been granted to the device 10 aimed at the target device 10.1-10.4, the procedure then terminates at stage 511'. Instead, if positioning permission has been granted to the device 10, then in stage 512 the device 10.1-10.4 collects and sends the initiation information that it has set to be provided to the device 10. For this purpose, there are code means 31.3", 31.2" in the devices 10.1-10.4. In the case according to the embodiment, at its simplest the information consists of the name PERSON1-PERSON4 of the possessor of the device 10.1-10.4. The information PERSON1_INFO, i.e. in this case the name (Jim) of the possessor of the device 10.1 can be in the memory MEM of the device 10.1-10.4 of each user PERSON1-PERSON4.

As stage 513, the device 10 that has requested information receives the information provided by them from the devices 10.1-10.4. In the embodiment, the information PERSON1_INFO-PERSON4_INFO thus includes, at its simplest, the names of the persons PERSON1-PERSON4 Jim, Helen, John, Mike (FIG. 6a). The names are merged with the image information IMAGE_PERSONS formed possibly in real time by the camera means CAM and shown on the display DISP.

As additional information, besides the names Jim, Helen, John, Mike, the position data of the devices 10.1-10.4 can also be received from the devices 10.1-10.4. On the basis of the position data of the devices 10.1-10.4, if the accuracy of the positioning permits, the names can be arranged in the image information IMAGE_PERSONS in the correct order. If the information PERSON1_INFO-PERSON4_INFO received from the devices 10.1-10.4 includes only the name, it can then be identified, for example, from the flag data accompanying it. In that case, the application TIA of the device 10, or the user USER A can add the explanation 'People in the picture:' to the image information IMAGE_PERSONS in connection with the names. The user USER A of the device 10 can also make additions to the image information. Second information provided on the target PERSON1-PERSON4 can be merged as metadata with the image information IMAGE_PERSONS. Embodiments corresponding to applicable parts of those presented in connection with the Street embodiment are also possible. There are numerous forms of further development of the invention, nor does the main principle of the invention in any way restrict them. The embodiment terminates at stage 514.

In the embodiment shown in FIG. 6a, the metadata PERSON1_INFO-PERSON4_INFO of the people PERSON1-PERSON4 in the field of view of the camera device 10 can also be stored in connection with the image IMAGE_PERSONS. The image IMAGE_PERSONS can be stored in the memory MEM of the device 10, from where it and the attached second information PERSON1_INFO-PERSON4_INFO can also be examined afterwards. Such an embodiment will also permit a return to the information relating to the target. The embodiment in question can, of course, also be applied in the case of other applications permitted by the invention.

The images of the people PERSON1-PERSON4 who are the targets aimed at in FIG. 6a are taken from so close that the positioning information they provide may, in the light of present technology, be too imprecise to assume that they are present in the image. The image in question is indeed only intended to illustrate one possible application of the invention. Aiming from farther away from the target will achieve already more acceptable positioning accuracy.

Correspondingly, FIG. 6b shows an embodiment, in which in stage 512 a link identifier 110 is sent to the device 10. In stage 513, this link identifier 110 is shown in the location of each person PERSON1-PERSON4. By activating the identifier 110, the user USER A can download to their device 10 more detailed information on the person in question.

The local-network technologies applied in this embodiment can also be applied in the Street embodiment. In this case, the invention can be used to avoid, for example, the forced information according to the prior art implemented by push service, with which businesses bombard passers-by, by applying local-network technologies. Now the user USER A can easily obtain the information on the target they want at their own initiative.

On the other hand, the provision of second information PUB_INFO to the device 10 even also beforehand is, of course, possible. In that case, when the user USER A arrives in the local-area-network area of the business PUB, the business PUB can push, for example, its menu PUB_INFO to the cache memory CACHE of the device 10, as a push service, even though the user USER A does not even aim at the business PUB. When the device 10 leaves the local-area-network area of the business PUB in a set manner, the menu PUN_INFO is removed from the cache memory CACHE of the device 10. Thus, if the user USER A happens to aim at the relevant business PUB, the menu PUB_INFO is immediately available in the cache memory CACHE, because it has already been downloaded ready to the device 10.

According to yet another alternative embodiment, in stage 507 it is possible to alternatively request position data from devices 10.1-10.4 that are found in the vicinity. In this, it is possible to apply, for example, the SIP protocol, the operation of which is, as such, known. When the position information of the devices 10.1-10.4 that are the objects of interest is received, it can be compared with the position and attitude information defining the aiming direction of the device 10. If this shows that the device 10 was used to aimed at precisely the devices 10.1-10.4 that are the objects of interest, an information request is then made concerning the information PERSON1_INFO-PERSON4_INFO set to be provided by the devices 10.1-10.4. Thus, the processing of the data can be performed, in this embodiment too, in the most diverse ways and there is no need to equip the target devices 10.1-10.4 with special functionalities in any way.

Embodiment Fair

According to yet a third embodiment shown in FIG. 8, which the basic idea of the invention surprisingly provides, the application of the camera means CAM, DISP in the context of the invention permits the positioning of a communication device 10.1 equipped with positioning means GPS and an illustrative way to search for such a device 10.1. The embodiment is described with reference to flow diagram 7.

The user USER A is at a fair, in which their friend PERSON1 has been lost in a large crowd (FIG. 1, fairs). In stage 700, the user USER A activates the application TIA in the device 10, in which there can be a 'friend lost' function as a sub-module. In stage 701, the user USER A sends as first information from their device 10 a positioning request of the target device 10.1 to the transmission network 100. In it, identification IMSI_10.1 of the person PERSON1, or in general a positioning request concerning the device 10.1, which is to be understood in the context of the invention as first information, is sent to a positioning data server TIS arranged in a transmission network 100, or even directly through the transmission network 100, BWA to the actual device 10.1 to be positioned.

More precisely, in positioning applying a local-area-network BWA, it is also possible to apply a direct local-area-network connection between two or more devices 10, 10.1, or for example, structureless ad-hoc type networking between the devices 10, 10.1-10.4. In structureless networking, at least some of the devices 10.1-10.4 can forward traffic they receive from a device in the local area to the next device in the local area. Thus, in a dense concentration of population, it is possible to use a network system organized by only the devices 10.1-10.4 themselves cover larger areas than in the case of a local-area-network area formed by a single device (applicant's PCT application FI2002/001010).

As a result of stage 700', the device 10.1 is ready to receive positioning requests, as stage 702 (code means 31.4" in device 10.1, code means 31.2' in server TIS). As stage 703, a check is made as to whether positioning permission has been granted to the device 10 (code means in sever TIS: 31.4' or in the device 10.1: 31.6"). If permission has not been granted, the procedure terminates at stage 704'. However, if permission has been granted to the device 10, then as stage 704 the target device's 10.1 own position is determined, for example, using software by code means 31.1", for example, by GPS positioning and an altitude measurement BM (if TIS, then code means 31.3'). As stage 705, the target device 10.1 collects and transmits, as second information, using code means 31.2", 31.3" (code means 31.3', 31.5' in server TIS), its position information back to the device 10, which receives it in stage 706.

In this case, the position information can consist of data X, Y produced by GPS positioning of the device 10.1 and, in addition, altitude data ALT of the device 10.1. This is because the person being sought may be, together with the device 10.1, for example, on a balcony on the highest floor of a building, in which case their X, Y co-ordinates may be more of less the same as those of the person equipped with the device 10 searching for them, who is, for example, at street level.

As stage 707, the device 10 can, in the device 10, determine is own position. On the basis of the determined position of the device 10 and the received position of the target device 10.1, when the aiming orientation AZM, ROT, of the camera means CAM of the device 10 is also known, it is possible, using for example code means 31.5, to define a sign 120 showing the position of the target device 10.1. In other words, in this case the position of the target PERSON1 is defined relative to the device 10 of the searching party USER A.

The sign, which can be, for example, a graphical arrow element 120, including the name of the person sought (Jim), which can be retrieved from the subscriber-identifier connection IMSI_10.1 stored in the subscriber-identifier memory IL, points in the direction in which the user USER A should move in order to find the person PERSON1 they are seeking. The arrow 120 can be shown merged in stage 708 in the display DISP of the device 10, for example, with the image information IMAGE_FAIRS formed in real time, in which case its position and direction can change when the user USER A moves in the crown while searching. On the other hand, the arrow 120 can also be shown in the display DISP without the real-time image information IMAGE_FAIRS. The arrow 120 can be visualized, for example, somewhere at the edge of the display DISP, pointing in the direction in which the user USER A should turn, if the camera CAM is not oriented towards the person PERSON1 being sought. If the person PERSON1 being sought is in the direction of the view imaged by the camera CAM, then in that case the view in the display DISP can be like that shown in FIG. 8, showing at least approximately the position of the person PERSON1 in the image IMAGE_FAIRS. Aiming now takes place slightly later in the sub-stages of the method.

If the person PERSON1 is found, then the performance of the series of operations can be terminated in stage 709 at stage 710. However, if a delay of a set length occurs in stage 709 and the termination command is not given by the user USER A, a return can then be made to stage 701, from which the performance of the procedure is continued. At the same, it is, however, possible to still show in the display DISP the arrow 120 according to the old position information of the target device 10.1, in the definition of which are used the position and orientation of the own device 10 changing owing to the search operations. Because the person PERSON1 may be moving, their position in the fair area may of course change, as a result of which new positioning of the target device 10.1 will be required. The set interval of time can be, for example 5 seconds-2 minutes, depending, for example, on the nature of the target being positioned. For their part, the user USER A may adjust this definition frequency, because it affects the data-transfer costs.

Of course, such an embodiment is possible, in which the position data of the target PERSON1 is received as a continuous service, for example, applying packet-data GPRS. In that case, when the target PERSON1 is found, the party ordering the positioning service can terminate the service call.

In the invention, not only geographical location information X, Y, ALT, but also distance information DST can be applied. A distance sensor DS arranged towards the aiming direction will then also be in the device 10, which will provide the information DST from the target PUB aimed at by the camera CAM to the device 10. This will bring considerable additional certainty to the definition of the target PUB. In some situations, by applying the distance information DST it may even possible to directly calculate the own co-ordinates of the aimed-at target, on the basis of which the position of the target can be determined.

Distance information also assists in defining the target, for example, in a situation in which there is an obstacle (e.g., a building) between the camera device 10 and the 'virtual object', the distance of which can be measured. If it is observed that the obstacle is closer than the intended object, it can be concluded that the obstacle covers the object from view and that it may not be worth drawing the object on the display DISP. The determining of the distance DST, or at least an improvement in the accuracy of the determining of the distance may also be possible from the image information, for example, on the basis of zooming data obtained from the zoom Z of the device 10. Sets of image information shot using different settings can also be applied. One example of this is disclosed in WO publication 96/30803. It appears to be applicable to the determining of distance, at least at close range (distance, for example <10 m).

According to another embodiment, it is possible, in a surprising manner, to also apply the zoom Z of the camera means CAM of the device 10. By using the zoom Z, it is possible to crop a distant target PUB, so that, for example, other targets near to it are no longer in the image information. If the current zoom setting of the camera CAM is known, it is then possible to estimate, on the basis of the orientation of the camera CAM and the position of the device 10, a target currently in the image IMAGE and at the same time in the viewfinder DISP, and even its position. On the basis of the zoom factor, the position of the intended target PUB becomes more accurate and it can be applied to the definition of the target PUB. One versed in the art will be able to vary the calculation relating to the zooming and to apply it instead of, or as well as the measurement of distance.

Even though the invention is described above mostly as embodiments, in which information PUB_INFO concerning the target PUB is provided to the device 10 at the request of the user USER A, (operational target locking stages 302 and 502), the information INFO_PUB can also be brought to the device 10 in essentially real time, or even beforehand. This makes it possible to merge the information INFO_PUB with the real-time image information IMAGE_PUB formed in connection with the aiming operation, without separate requests, or actual 'target lock-on stages', in other words, without the separate selection of the target PUB. In a 'digital shop-window' functionality of this kind, all, or at least some of the targets in the view, on which information is available, can be marked in the image of the viewfinder DISP of the camera CAM, mainly in real time or with a short delay, for example, with graphical indicators. The user can then, for example, stop the image of the viewfinder DISP and navigate to the location of the target (indicator) they desire and obtain additional information on the concerned target by selecting it.

In an embodiment of this kind, the bringing of the information, more generally the adapting of it to the device 10 can be performed either by pre-downloading over a network 100 from a server TIS and/or on the other hand, potentially also from a local-area network. In the application based on the server TIS, the device 10 can then mainly continuously define its own position X, Y, ALT. The device's 10 own position information X, Y, ALT, which is in itself light and can now form at least part of the first information formed by the device 10, can then be transmitted, for example, over a packet data connection to the server TIS on the basis of a set criterion, such as, for example, set intervals of time, or for instance when the position of the device 10 changes according to a set criterion (i.e. the device 10 itself determines that its position has changed sufficiently). In this case, it is thus not necessary to send, for example, the device's 10 orientation information AZM, ROT. In this embodiment, it is also possible to implement the device's 10 position information in the mobile communication network system.

The server TIS sends the information concerning the targets according to that how the device 10 approaches the target, or otherwise according to a set criterion is in the vicinity of the target. In a local-area network application, for example, the business PUB's own server can be equipped with local-area network means. When the server determines that the device 10 has entered its area, information PUB_INFO concerning the target PUB is pushed to the device 10.

On the other hand, there can also be cache memories CACHE in the device 10, in which information PUB_INFO, LIBRARY_INFO, RISTORANTE_INFO concerning different targets PUB, LIBRARY, RISTORANTE is arranged, either statically or dynamically. In this case, the dynamism may be such that, for example, when the device 10 enters a specific area (for example, a municipality, street, coverage of a mobile system base station), sets of (initialization) information (for example, a link address pointing to internet data network) on targets that have set information to be provided and which are located in the area of the relevant municipality/on the street/in the area of the base station, as well as also the targets' own position information is pushed to the device 10 or that downloads these from the server TIS (program codes 31.7, 31.6') (stages 305-307). In that case, in stage 308 the device 10 can even define itself which target its camera CAM is currently aimed at, and perform the necessary comparisons applying the position data of the targets, in order to define the aimed-at target (program code 31.8). If the target PUB is in the viewfinder DISP of the camera CAM, the information PUB_INFO concerning the target PUB is brought to the attention of the user according to the basic idea of the invention. In this embodiment, it is thus the application TIA of the device 10 instead of the server TIS that performs the concerned definitions. The drawings 3a and 3b, which show one way to implement the embodiment, are closely related to it.

FIGS. 9a-9c show, as a rough block diagram, some examples of the program products 30, 30', 30" according to the invention. The program products 30, 30', 30" can include storage media MEM and program code 31, 31', 31" to be executed by the processor means CPU of the device 10, 10.1, TIS and which are written on the storage media MEM. The storage media MEM of the program codes 31, 31', 31" can be, for example, a memory card arranged in connection with portable devices, a CD medium to be applied in a PC environment, or also a static or dynamic application memory of a device 10, 10.1, TIS, with which they can be directly integrated.

The program code 31 to be arranged in an electronic device 10 according to the invention, which is arranged as input to receive the position and orientation information X, Y, ALT, O$_{device}$ of the device 10, in order to define the target PUB, PERSON1, can include several code means 31.1-31.8 to be executed by the processor means CPU, the operation of which can be adapted to the method descriptions described immediately above. The code means 31.1-31.8 can form a group of consecutively performed processor commands, by means of which the desired functionalities desired in terms of the invention can be achieved in the device 10 according to the invention.

Further, in the device 10.1 shown in FIG. 2b, which can also be part of a system according to the invention providing, for example, second information set to be provided by the possessor of the device 10.1, can include, in the program code 31" of FIG. 9c, code means 31.1" for defining the device's 10.1 own position at least once and a code means 31.2" for returning the position of the device 10.1 to the device 10 that has requested it, at least once.

Further, in the server TIS shown in FIG. 1, which can also be a part of a system according to the invention providing, for example, a positioning service to be understood as second information, concerning the device 10.1, or an information service PUB_INFO concerning the business PUB, can include the code means 31.1'-31.6' shown in the program code 31' of FIG. 9b, for performing the operations stated in the aforementioned method descriptions.

It must be understood that the above description and the related figures are only intended to illustrate the present invention. The invention is thus in no way restricted to only the embodiments disclosed or stated in the Claims, but many different variations and adaptations of the invention, which are possible within the scope on the inventive idea defined in the accompanying Claims, will be obvious to one versed in the art.

The invention claimed is:

1. An apparatus comprising:
a processor; and
at least one memory including computer program instructions,
the at least one memory and the computer program instructions configured to, with the processor, cause the apparatus to perform at least the following:
determine position and orientation information of the apparatus when the apparatus captures an image of a target object shown in a viewfinder of the apparatus,
determine a distance between the target object and the apparatus based on one or more zoom settings of the viewfinder, distance sensor data collected by the apparatus, or a combination thereof,
transmit an information request via a network to a source, wherein the information request includes the position and orientation information of the apparatus and the distance without the image,
receive feedback information corresponding to the target object via the network from the source, wherein the feedback information includes identification of the target object, and
display a real-time image of the target object and the feedback information concurrently in the viewfinder,
wherein the target object is identified by the source based on the position and orientation information of the apparatus and the distance without using the image.

2. The apparatus according to claim 1, wherein the feedback information includes audio data.

3. The apparatus according to claim 1, wherein the apparatus is further caused to:
calculate a location and an altitude of the target object based on the distance, and the position and orientation information of the apparatus.

4. The apparatus according to claim 3, wherein the target object is at least partially blocked by an obstacle in the viewfinder.

5. The apparatus according to claim 3, wherein the target object is at least partially blocked by an obstacle in the viewfinder.

6. The apparatus according to claim 1, wherein the feedback information concerning the target object includes at least one reference to the network, which when activated, initiates downloading additional information concerning the target object to the apparatus.

7. A method comprising:
- determining, at an apparatus, position and orientation information of the apparatus when the apparatus captures an image of a target object shown in a viewfinder of the apparatus;
- determining, at the apparatus, a distance between the target object and the apparatus based on one or more zoom settings of the viewfinder, distance sensor data collected by the apparatus, or a combination thereof;
- transmitting an information request from the apparatus via a network to a source, wherein the information request includes the position and orientation information of the apparatus and the distance without the image;
- receiving feedback information corresponding to the target object from the source via the network to the apparatus, wherein the feedback information includes identification of the target object; and
- displaying a real-time image of the target object and the feedback information concurrently in the viewfinder,
- wherein the target object is identified by the source based on the position and orientation information of the apparatus and the distance without using the image.

8. The method according to claim 7, wherein the feedback information includes audio data.

9. The method according to claim 7, further comprising:
- calculating a location and an altitude of the target object based on the distance, and the position and orientation information of the apparatus.

10. The method according to claim 7, wherein the feedback information concerning the target object includes at least one reference to the network, which when activated, initiates downloading additional information concerning the target object to the apparatus.

11. The method according to claim 7, wherein the target object is at least partially blocked by an obstacle in the viewfinder.

12. An apparatus comprising:
- a processor; and
- at least one memory including computer program instructions,
- the at least one memory and the computer program instructions configured to, with the processor, cause the apparatus embedded in a source to perform at least the following:
- receive via a network an information request addressed to the source, wherein the information request includes position and orientation information of a user device when the user device captures an image of a target object shown in a viewfinder of the user device and the information request excludes the image;
- determine a distance between the target object and the user device based on one or more zoom settings of the viewfinder, distance sensor data collected by the user device, or a combination thereof;
- determine an identification of the target object by calculating a location and an altitude of the target object based on the position and orientation information of the user device and the distance without the image; and
- transmit feedback information corresponding to the target object from the source via the network to the user device, wherein the feedback information includes the identification of the target object.

13. The apparatus according to claim 12, wherein the feedback information concerning the target object includes at least one reference to the network, which when activated at the user device, initiates downloading additional information concerning the target object to the user device.

14. A method comprising:
- receiving, by an apparatus via a network, an information request addressed to the apparatus, wherein the information request includes position and orientation information of a user device when the user device captures an image of a target object shown in a viewfinder of the user device and the information request excludes the image;
- determining, by the apparatus, a distance between the target object and the user device based on one or more zoom settings of the viewfinder, distance sensor data collected by the user device, or a combination thereof;
- determining, by the apparatus, an identification of the target object by calculating a location and an altitude of the target object based on the position and orientation information of the user device and the distance without the image; and
- transmitting feedback information corresponding to the target object from the apparatus via the network to the user device, wherein the feedback information includes the identification of the target object.

15. The method according to claim 14, wherein the feedback information concerning the target object includes at least one reference to the network, which when activated at the user device, initiates downloading additional information concerning the target object to the user device.

16. The method according to claim 15, wherein the target object is at least partially blocked by an obstacle in the viewfinder.

* * * * *